2,900,669
Patented Aug. 25, 1959

2,900,669

IRREVERSIBLY ELONGATABLE CELLULOSE TRIACETATE STRUCTURE AND METHOD OF MAKING

Max H. Booth, Waynesboro, Va., assignor to E. I. du Pont de Nemours and Company, Wilmington, Del., a corporation of Delaware No Drawing. Application March 27, 1957
Serial No. 648,787

7 Claims. (Cl. 18—48)

This invention relates to the treatment of organic cellulose derivatives, and has particular reference to essentially undrawn shaped articles composed of cellulose acetate which exhibit the property of spontaneous elongation.

When partially oriented films composed of cellulose acetate are immersed in suitable warm aqueous swelling agents, they extend without the application of any external stress. This phenomenon has been termed "spontaneous elongation," and differs from a swelling process in that the degree of extension achieved is substantially retained after cooling and drying, i.e., the change is irreversible. The phenomenon is not new in the art. In 1944, Freund and Deutsch (U.S. 2,353,023) disclosed a treatment for cellulose acetate films containing residual solvent which comprises a prior orientation treatment effected by mechanical stretching, followed by immersion in a warm aqueous solution of a suitable swelling agent (alcohol, diacetone alcohol, or ethyl lactate). The treatment results in the spontaneous elongation of the cellulose acetate film in the direction of original orientation. In 1954 Majury and Wellard (Ref.: Atti del Simposio Internazionale di Chemica Macromoleculare, 1954, pp. 354–366. B.R.R.A. Soc. Reprint #49, pp. 115–25) described a similar treatment, which comprises stretching a cellulose acetate film in a swelling bath, followed by deswelling under tension, and finally, immersion in a warm aqueous solution of a swelling agent (e.g., phenol) results in the spontaneous elongation of the film in the direction of original orientation. A necessary condition for spontaneous elongation common to both processes is immersion subsequent to orientation of the films in a warm aqueous solution of a suitable swelling agent, selected from several preferred species. Further, both processes are limited in their scope and utility to films which are composed of secondary cellulose acetate. Neither is suitable for commercial adaptation utilizing conventional apparatus and processing steps, especially in connection with filamentary structures, such as yarns, threads, and the like.

Accordingly, an object of this invention is a rapid continuous process for the preparation of shaped structures particularly filaments composed of organic cellulose derivatives which exhibit the property of spontaneous elongation. A further object is to produce shaped structures composed of cellulose acetate which exhibit the property of spontaneous elongation. Another object is to produce shaped structures composed of cellulose acetate which exhibit spontaneous elongation by utilizing existing apparatus and process steps. Yet another object is shaped structures composed of cellulose triacetate which exhibit the property of spontaneous elongation. These and further objects, together with the means for their accomplishment will appear hereinafter.

In general, the objects of this invention are accomplished by subjecting shaped structures of organic cellulose derivatives which possess high dry-elongation properties to a heat treatment which is characterized by high temperatures applied for very short periods of time, followed by rapid cooling. Shaped structures prepared according to this procedure exhibit the property of spontaneous elongation when they are subjected to conditions of swelling described more fully hereinafter.

In the following description of this invention, cellulose acetate will be used to exemplify the generic term "organic cellulose derivative" since it is well-known, and "filamentary structure" will be used to exemplify the generic term "shaped structure" since in this form the invention has its greatest utility. It is intended to include fibers, filaments, threads, yarn, ribbons, films, and the like.

To facilitate an understanding of the invention, reference should be made to the following definitions and explanations of terms. These terms, whenever employed in the specification and claims, are to be construed in accordance with such definitions and explanations.

Cellulose triacetate refers to acetylated cellulose which contains an average content of about 2.7 to 3.0 acetyl groups per glucose unit. Secondary cellulose acetate signifies reduced acetyl content, usually within the range of about 2.0 to about 2.6 acetyl groups per glucose unit of the cellulose, cellulose acetate in the upper part of that range being considered herein as soluble in acetone.

Dry elongation, expressed as percent of original length, is the amount of stretch that takes place in a yarn before breaking under the influence of longitudinal stress. This value is measured at standard conditions, 70° F. and 65% RH. The values depend on the condition of breaking. Suter testers, which stretch at a constant rate to break were used to obtain the values reported herein.

The term "filamentary structure," as used herein refers to articles of manufacture having a length which greatly exceeds any transverse dimension, such as yarns, filaments, fibers, threads, and the like. The term "spontaneous elongation," as discussed in the foregoing, refers to a spontaneous and irreversible increase in length along the long axis (in the dimension of length) of such structures.

Spinning conditions which are conducive to high dry elongation properties of a continuous filament yarn include an increase in the temperature of the spinning solution, a decrease in the diameter of the spinneret orifice, and a decrease in the amount of stretch in the spinning cell. Yarns spun under such conditions are characterized by high values (greater than 30%) for the property of dry elongation. This is believed due in part to a carrying-over of orifice orientation (partial alignment of the polymer chains) into the incipient filaments, and apparently results from the conditions of high orifice shear. The retention of this polymer orientation into the yarn per se is favored by reduced stretch in the spinning cell. Such yarns can be further oriented by hot drawing, e.g., up to about 2× or more, prior to the heat treatment, although this is an optional step, and is not essential to the practice of the present invention.

The heat treatment of high elongation yarns, hereinafter termed "hot relaxation," gives a more favorable orientation of the ordered regions without allowing them to grow or crystallize. This is accomplished by exposing the yarns to high temperatures which are applied for very short periods of time, followed by rapid cooling to room temperature. The process is further characterized by low operating tensions so that the hot relaxation is accomplished with a decrease in the length of the yarn of at least about 10%. In general, shrinkage of at least about 20% (based on original yarn length) is preferred, with shrinkage from about 10–20% useful. In the preferred embodiment of the invention, the hot relaxation is accomplished by the continuous passing of the yarn in the direction of its long axis through a tube which contains a radiant heater along its entire length. In this manner, the high temperatures required for the purpose of this invention are conveniently achieved, and the rapid cooling of the yarn is effected when it passes out of the heated zone into the room. By fixing the speed at which the yarn passes through the tube, the time of heating can be accurately controlled. The amount of shrinkage permitted is controlled by altering the entering and exiting speeds of the yarn. The ratio of exit speed to the input speed of the yarn is a measure of the amount of shrinkage which has occurred in the tube.

The necessary hot-relaxation of drawn yarns can be conveniently accomplished in an oven, by treating the yarns continuously or in skeins. The most useful range of temperature for this invention is from 175–250° C. The particular temperature used should be above the apparent "second order transition temperature" of the cellulose composition in the yarn. The "second order transition temperature," Tg, refers to an internal softening point, and is more completely described by R. F. Boyer and R. S. Spencer in "Advances in Colloid Science," volume 2, Interscience Publishers, Inc. (1946). The upper temperature limit is that which causes stiffening or fusion of the yarn.

The time of exposure is of the order of fractions of seconds, preferably 0.1 second, too short for crystallization as indicated by X-ray diffraction data to occur. If the as-spun yarn has been hot-drawn, the time of the hot relaxation can be made much longer, e.g., on the order of minutes at the indicated temperatures. The use of liquids which are not swelling agents for cellulose acetate as heating media for the purpose of this invention is comprehended, although the high temperatures required ordinarily limit the use of such means. However, any inert heating medium, e.g., Wood's metal, is useful that brings the yarn to the desired temperature without exerting length-increasing stresses.

Yarns prepared according to the process described in the foregoing exhibit the property of spontaneous elongation, i.e., elongation without applying a drawing force along the long axis of the yarn when exposed to conditions of swelling. At present it appears that these conditions probably allow high internal mobility of the polymer molecules in the fiber so that chain parallelization may occur, which results in the lengthening of the structure at the expense of the less ordered regions.

The nature of and the criteria for selection of the swelling conditions which cause the spontaneous elongation to occur are high temperatures and inert liquids including water, aqueous liquids, e.g., a mixture of water and alcohol, or aqueous solutions of unreactive salts, e.g., sodium sulfate. The required temperature of the swelling solution for the present invention is relatively high, e.g., from at the boil or above, or from about 90° C. in water. Spontaneous elongation is preferably carried out by treatment with such solutions maintained at the boil. Steam under pressure has proved to be effective in promoting the spontaneous elongation of the articles of this invention. Steam under a pressure above 50 p.s.i.g., however, has a deleterious effect on cellulose acetate.

Shaped structures composed of either secondary cellulose acetate or cellulose triacetate satisfactorily serve the purpose of the present invention. The use of other organic cellulose derivatives is applicable, such as the simple organic esters of cellulose, e.g., cellulose propionate or cellulose butyrate, the mixed esters of cellulose, e.g., cellulose acetate butyrate, ether-esters of cellulose, e.g., ethyl cellulose acetate, or ethers of cellulose, e.g., ethyl cellulose. For cellulose acetate, the lower the degree of acetyl substitution of the cellulose, the more effective is the final swelling treatment, since secondary cellulose acetate is more hydrophylic than cellulose triacetate. Further, the greater the degree of acetyl substitution of the cellulose, the more important is the hot relaxation step, as cellulose triacetate in general is more prone to undergo crystallization, which occurs at the expense of spontaneous elongation. Finally, for any degree of acetyl substitution of the cellulose, it is essential to start with high elongation yarns, even if such yarns are to be drawn, so that sufficient shrinkage will occur in the hot relaxation step. Undrawn spontaneous elongation cellulose acetate yarns characteristically have high initial dry-elongation (greater than 30%), which is reduced in the final swelling treatment.

Filamentary structures of secondary cellulose acetate or cellulose triacetate which possess the property of spontaneous elongation of at least 0.5% are considered useful in the present invention. Yarns which possess the property of spontaneous elongation may be used in the preparation of novel threads which bulk permanently when exposed to swelling conditions, by plying these yarns with yarns which have a degree of residual shrinkage or alternatively, with yarns which are dimensionally stable. Yarns which possess the property of spontaneous elongation are useful in fabrics where unusual texture, bulk, loft, or other properties are desirable, such as in the preparation of cotton-like fabrics. Structures of cellulose acetate which possess the property of spontaneous and irreversible elongation exhibit all the useful properties characteristic of such compositions.

The following examples will serve to illustrate the invention, and are not intended to be construed as limiting the invention thereto since any organic derivative of cellulose may be substituted in the examples with appropriate modification for the cellulose acetate.

Example I

A sample of cellulose triacetate containing 2.8 acetyl groups per glucose unit is dry-spun by conventional methods from methyl acetate/acetone (60/40 by weight) to give a 75 denier, 24 filament yarn having a dry elongation of 37%. The yarn is passed at a rate of 270 y.p.m. through a 2.5 foot tube of 5 inch diameter containing a radiant heater its entire length. This apparatus provided a temperature of 200±25° C., and is sufficient to give shrinkage up to 30% of the original fiber length, provided the wind-up tension on the yarn does not exceed 0.02 g.p.d. The yarn cools quickly as it passes out of the tube into room air, and is found to show the following length changes in the indicated after treatment:

| Percent Shrinkage Allowed In The Hot Tube | Percent Spontaneous Elongation [1] | |
|---|---|---|
| | Heated In 99° C. Water, 30 mins. | Heated In 25 p.s.i.g. Steam, 30 mins. |
| 30 | 3.3 | 6.9. |
| 20 | 3.3 | 3.3. |
| 10 | 1.8 | 0.5. |
| yarn before passing through tube | 1.2% shrinkage | 4.4% shrinkage. |

[1] Based on new sample length after the hot relaxation.

Example II

Cellulose acetate containing 2.4 acetyl groups per glucose unit is dry-spun from acetone solution to give a 75 denier, 24 filament yarn having a dry elongation of 40%. When hot relaxed 30% at 200° C. it spontaneously elongated 10% after 30 minutes in boiling water.

Example III

Cellulose triacetate containing 2.9 acetyl groups per glucose unit is dry-spun from methylene chloride/methanol (90/10) to give a 150 denier, 24 filament yarn having a dry elongation of 50%. The yarn is drawn 1.7× at a rate of 300 y.p.m. in a radiant-heat apparatus similar to that described in Example I. After being hot relaxed in an oven for one minute at 230° C., it spontaneously elongated 7% after 30 minutes in boiling water. When the hot-relaxation step is omitted, no measurable change in the length of the yarn occurs after 30 minutes in boiling water.

*Example IV*

Cellulose acetate containing 2.6 acetyl groups per glucose unit is dry-spun from acetone into a 250 denier, 50 filament yarn having a dry elongation of 52%. The yarn is drawn 1.5× at a rate of 50 y.p.m. in boiling water, then hot relaxed in an oven for one minute at 210° C. The yarn spontaneously elongated 18% after 20 minutes in 15 p.s.i.g. steam. When the hot-relaxation step is omitted, no measurable change in the length of the yarn occurs after 20 minutes in 15 p.s.i.g. steam.

The process of the present invention is adaptable to a continuous process, and incurs no great loss of productivity. Further, it is applicable to structures composed of cellulose triacetate as well as those composed of secondary cellulose acetate. The final swelling treatment can be conveniently accomplished by treating the yarns as such or as components in a woven or knitted fabric. When such yarns are incorporated in fabrics, the spontaneous elongation can be produced at the "boil-off" (process where textile lubricants are removed from the fabric prior to dyeing) or in the actual dyeing step, since such dye baths are often maintained at the necessary temperatures and contain materials which cause the yarn to swell. The property of spontaneous elongation appears to be additive, therefore, a combination of finishing steps can serve to supply the total spontaneous elongation in increments by a combination of separate swelling steps for the required lengths of time. Further advantages inherent in the practice of this invention will occur to those undertaking its practice.

It will be apparent that many widely different embodiments of this invention may be made without departing from the spirit and scope thereof, and therefore it is not intended to be limited except as indicated in the appended claims.

I claim:
1. The process of producing irreversibly elongatable shaped structures which comprises treating an essentially drawn shaped structure of an organic ester of cellulose having a dry elongation of at least 30% by heating said structure to a temperature above the second order transition temperature and below the decomposition temperature of said organic ester of cellulose for a period of time less than that necessary for crystallization of said structure wherein a shrinkage of at least 10% of the original length of said structure is obtained.
2. The process of claim 1 in which the structure is a film.
3. The process of claim 1 in which the said structure is a filament.
4. The process of claim 1 in which the heating temperature is from about 175° C. to 250° C.
5. The process of claim 1 in which the structure is subsequently treated in an inert aqueous medium at a temperature from about 90° C. to the temperature of steam under 50 p.s.i.g.
6. The process of claim 1 in which said heating at said temperature is for a period of less than one second.
7. An essentially undrawn shaped structure of cellulose triacetate having the property of irreversible elongation of at least 0.5% when treated in an inert aqueous medium at a temperature from about 90° C. to the temperature of steam under 50 p.s.i.g.

References Cited in the file of this patent

UNITED STATES PATENTS

| | | |
|---|---|---|
| 2,157,167 | Dreyfus | May 9, 1939 |
| 2,353,023 | Freund et al. | July 4, 1944 |
| 2,584,779 | Averns et al. | Feb. 2, 1952 |

UNITED STATES PATENT OFFICE
CERTIFICATE OF CORRECTION

Patent No. 2,900,669                                            August 25, 1959

Max H. Booth

It is hereby certified that error appears in the printed specification of the above numbered patent requiring correction and that the said Letters Patent should read as corrected below.

Column 4, line 66, for "200% C." read -- 200° C. --; column 6, line 6, for "drawn" read -- undrawn --.

Signed and sealed this 4th day of April 1961.

(SEAL)
Attest: ERNEST W. SWIDER

Attesting Officer

ARTHUR W. CROCKER
Acting Commissioner of Patents